US009155023B2

(12) United States Patent
Chen et al.

(10) Patent No.: US 9,155,023 B2
(45) Date of Patent: Oct. 6, 2015

(54) APPARATUS AND METHODS FOR COMMUNICATING SYSTEM STATE INFORMATION CHANGE TO WIRELESS DEVICES

(75) Inventors: An Mei Chen, San Diego, CA (US); Prasanna Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 728 days.

(21) Appl. No.: 11/734,656

(22) Filed: Apr. 12, 2007

(65) Prior Publication Data

US 2008/0108376 A1    May 8, 2008

Related U.S. Application Data

(60) Provisional application No. 60/864,571, filed on Nov. 6, 2006.

(51) Int. Cl.
  *H04W 8/24*    (2009.01)
  *H04W 68/00*   (2009.01)
  (Continued)

(52) U.S. Cl.
  CPC .............. *H04W 48/08* (2013.01); *H04H 40/18* (2013.01); *H04W 8/245* (2013.01); *H04W 68/00* (2013.01); *Y02B 60/50* (2013.01)

(58) Field of Classification Search
  CPC ............................... H04W 8/245; H04W 68/00
  USPC ................................................. 455/412.2, 515
  See application file for complete search history.

(56) References Cited

U.S. PATENT DOCUMENTS

| 6,119,021 A * | 9/2000 | Katz ............................. 455/561 |
| 6,400,942 B1 | 6/2002 | Hansson et al. |
| 6,421,540 B1 | 7/2002 | Gilhousen et al. |

(Continued)

FOREIGN PATENT DOCUMENTS

| CN | 1680825 A | 10/2005 |
| JP | 2004040666 A | 2/2004 |

(Continued)

OTHER PUBLICATIONS

ETSI TS 143 246 (Sep. 2006) Digital Cellular Telecommunications System (Phase 2+); Multimedia Broadcast/Multicast Service (MBMS) in the GERAN; Stage 2 (3GPP TS 43.246 version 6.9.0 Release 6).

(Continued)

*Primary Examiner* — Marisol Figueroa
(74) *Attorney, Agent, or Firm* — Norton Rose Fulbright US LLP

(57) ABSTRACT

Apparatus and methods for communication system state information change to wireless devices in a content server network in a resource and power efficient manner are disclosed. In particular, a disclosed method for conveying system state information to a wireless device includes sending a primary message including first information configured to communicate a current system state to the wireless device, and then sending second information set usable by the wireless device to update system state information. By summarizing or abbreviating the first information, a receiving device can easily compare to past system states to determine whether further processing, such as processing of the second information, is needed, thereby affording the conservation of processing and power resources of a receiving device. Corresponding apparatus are also disclosed.

83 Claims, 9 Drawing Sheets

(51) Int. Cl.
*H04W 48/08* (2009.01)
*H04H 40/18* (2008.01)

(56) References Cited

U.S. PATENT DOCUMENTS

| | | | |
|---|---|---|---|
| 6,628,946 B1* | 9/2003 | Wiberg et al. | 455/434 |
| 6,941,354 B2* | 9/2005 | Odamura | 709/219 |
| 6,950,419 B1* | 9/2005 | Park et al. | 370/338 |
| 7,069,333 B1 | 6/2006 | Morris et al. | |
| 7,123,900 B2 | 10/2006 | Brown et al. | |
| 7,400,625 B2* | 7/2008 | Rizzo et al. | 370/392 |
| 7,747,995 B2* | 6/2010 | Fritsch et al. | 717/168 |
| 2002/0129089 A1* | 9/2002 | Hegde et al. | 709/200 |
| 2002/0168985 A1 | 11/2002 | Zhao et al. | |
| 2003/0147390 A1 | 8/2003 | Rizzo et al. | |
| 2005/0014507 A1 | 1/2005 | Iimori | |
| 2005/0164683 A1* | 7/2005 | Roberts et al. | 455/412.2 |
| 2006/0020938 A1* | 1/2006 | Elcock et al. | 717/178 |
| 2006/0068780 A1* | 3/2006 | Dalsgaard et al. | 455/432.3 |
| 2006/0166693 A1 | 7/2006 | Jeong et al. | |
| 2006/0187897 A1 | 8/2006 | Dabbs et al. | |
| 2006/0189300 A1* | 8/2006 | Hwang et al. | 455/412.2 |
| 2007/0042757 A1 | 2/2007 | Jung et al. | |
| 2007/0172059 A1 | 7/2007 | Yamaguchi et al. | |
| 2007/0287440 A1* | 12/2007 | Benkert et al. | 455/422.1 |
| 2008/0107057 A1 | 5/2008 | Kannan et al. | |

FOREIGN PATENT DOCUMENTS

| | | |
|---|---|---|
| JP | 2005039369 A | 2/2005 |
| JP | 2005204305 A | 7/2005 |
| JP | 2006018359 A | 1/2006 |
| JP | 2008507912 A | 3/2008 |
| JP | 2008535365 A | 8/2008 |
| JP | 2009536393 A | 10/2009 |
| WO | 03063417 A2 | 7/2003 |
| WO | WO 2005/015861 A1 | 2/2005 |
| WO | 2005039128 A1 | 4/2005 |
| WO | WO2006012378 | 2/2006 |
| WO | 2006030290 | 3/2006 |
| WO | WO-2006082812 A1 | 8/2006 |
| WO | WO2006104335 A2 | 10/2006 |
| WO | 2007143392 | 12/2007 |

OTHER PUBLICATIONS

International Search Report and Written Opinion—PCT/US2007/083220, International Search Authority—European Patent Office—Apr. 3, 2009.

Taiwan Search Report—TW096141904—TIPO—May 12, 2011.

Luby, et al., "FLUTE—File Delivery over Unidirectional Transport", IETF RFC 3926, pp. 1-35, (Oct. 2004).

\* cited by examiner

APPARATUS AND METHODS FOR COMMUNICATING SYSTEM STATE INFORMATION CHANGE TO WIRELESS DEVICES

CLAIM OF PRIORITY UNDER 35 U.S.C. §119

The present Application for Patent claims priority to Provisional Application No. 60/864,571 entitled "APPARATUS AND METHODS FOR CONVEYING SYSTEM STATE INFORMATION CHANGE TO WIRELESS DEVICES IN A POWER-EFFICIENT MANNER" filed Nov. 6, 2006, and assigned to the assignee hereof and hereby expressly incorporated by reference herein.

REFERENCE TO CO-PENDING APPLICATIONS FOR PATENT

The present Application for Patent is related to the following co-pending U.S. Patent Application:

U.S. application Ser. No. 11/734,640, issued Jan. 27, 2015 as U.S. Pat. No. 8,942,739, entitled "METHODS AND APPARATUS FOR COMMUNICATION OF NOTIFICATIONS" filed concurrently herewith, assigned to the assignee hereof, and expressly incorporated by reference herein.

BACKGROUND

1. Field

The present application relates to apparatus and methods for communicating system state information change to wireless devices, and more particularly to communicating changes in system state information using an abbreviated primary message in order to conserve power and system resources.

2. Background

In a wireless broadcast environment, such as in orthogonal frequency division multiplexed (OFDM) broadcast systems, wireless devices need to obtain the latest or updated system state information so that users of such devices can access and receive the latest data or content over the wireless broadcast network with minimal delay. Specifically, in order to obtain the latest system state information, a wireless device needs to continuously receive and process the updated information. This procedure, however, introduces significant drainage on the wireless device power resources and, therefore, reduces its standby time. It is axiomatic that mobile devices by their nature have limited power and processing resources. Thus, the requirement to obtain the latest system state information, which utilizes processing and power resources, introduces many challenges for power conservation in wireless devices.

SUMMARY

According to an aspect to the present disclosure, a method is disclosed for conveying system state information to a wireless device. The method includes sending a primary message including first information configured to communicate a current system state to the wireless device. The method further includes sending a second information set usable by the wireless device to update system state information.

According to another aspect, an apparatus for conveying system state information to a wireless device is disclosed. The apparatus includes means for sending a primary message including first information configured to communicate a current system state to the wireless device. Additionally, the apparatus includes means for sending a second information set usable by the wireless device to update system state information.

According to still another aspect, a computer program product including a computer-readable medium is disclosed. The medium includes code for causing a computer to send a primary message including first information configured to communicate a current system state to the wireless device. Further, the medium includes code for causing the computer to send a second information set usable by the wireless device to update system state information.

According to a further aspect a server processor for conveying system state information to a wireless device is disclosed. The server processor includes a first module for sending a primary message including first information configured to communicate a current system state to the wireless device. A second module for sending a second information set usable by the wireless device to update system state information is also included.

According to another aspect, a method for obtaining system state information in a wireless device is disclosed. The method includes monitoring a primary message configured to include first data indicating system state information, and determining a change in system state information based on the first data in the primary message indicating system state information.

According to still another aspect, an apparatus for obtaining system state information is disclosed. The apparatus includes means for monitoring a primary message configured to include first data indicating system state information. Also, the apparatus includes means for determining a change in system state information based on the first data in the primary message indicating system state information.

According to yet a further aspect, a computer program product including a computer-readable medium is disclosed. The medium includes code for causing a computer to monitor a primary message configured to include first data indicating system state information. The medium further includes code for causing the computer to determine a change in system state information based on the first data in the primary message indicating system state information.

According to a still further aspect, a wireless device for receiving system state information is disclosed. The device includes a first module for monitoring a primary message configured to include first data indicating system state information, and a second module for determining a change in system state information based on the first data in the primary message indicating system state information.

DETAILED DESCRIPTION

This present disclosure describes apparatus and methods to effect the communication of system state update information using a primary message with a first set of information or data configured to indicate whether a change or update to current system state information has occurred. If a change has occurred, further second information or data may then be either broadcast or requested. The second information includes further particular system state information usable by a device to update the system state information. By transmitting a primary message on a network, where the message includes summarized or abridged data indicating whether a change in the system state information has occurred, a receiving device can quickly determine whether updates or changes of system state have occurred by processing this abbreviated message, rather than a more complex message. Accordingly, a receiving device may achieve lower battery power consumption, while also reducing the aggregate level of processing needed to be performed by the device. Additionally, the multicast bandwidth required to send a shorter or abbreviated message is also reduced. It is noted here that for purposes of the present application, the terms "network" and "server" are used synonymously and interchangeably.

Known wireless broadcast systems, such as forward link only (FLO) systems support update of device configuration files. As discussed previously, a primary message carries latest versions of device configuration files. In the presently disclosed methods and apparatus, the primary message includes a first information set, such as a current system state version number, which may then be used by devices receiving the information to determine if any system changes have occurred and if the device needs to receive updated system information. If the system has changed, the device can then acquire the appropriate flow or flows to obtain the latest information if the broadcasted system state version number is different from a version number stored in the device. Otherwise, the device can go back to sleep if no system state change has occurred as indicated by the version number, thus saving processing and energy resources in the device. It is also noted that the primary message can be configured to communicate particular latest information updates. Accordingly, a device can determine which flow or flows that it needs to acquire to obtain updated information, rather than listening to all of the flows, which also affords savings in processing and energy resources in the device.

Figure 1:
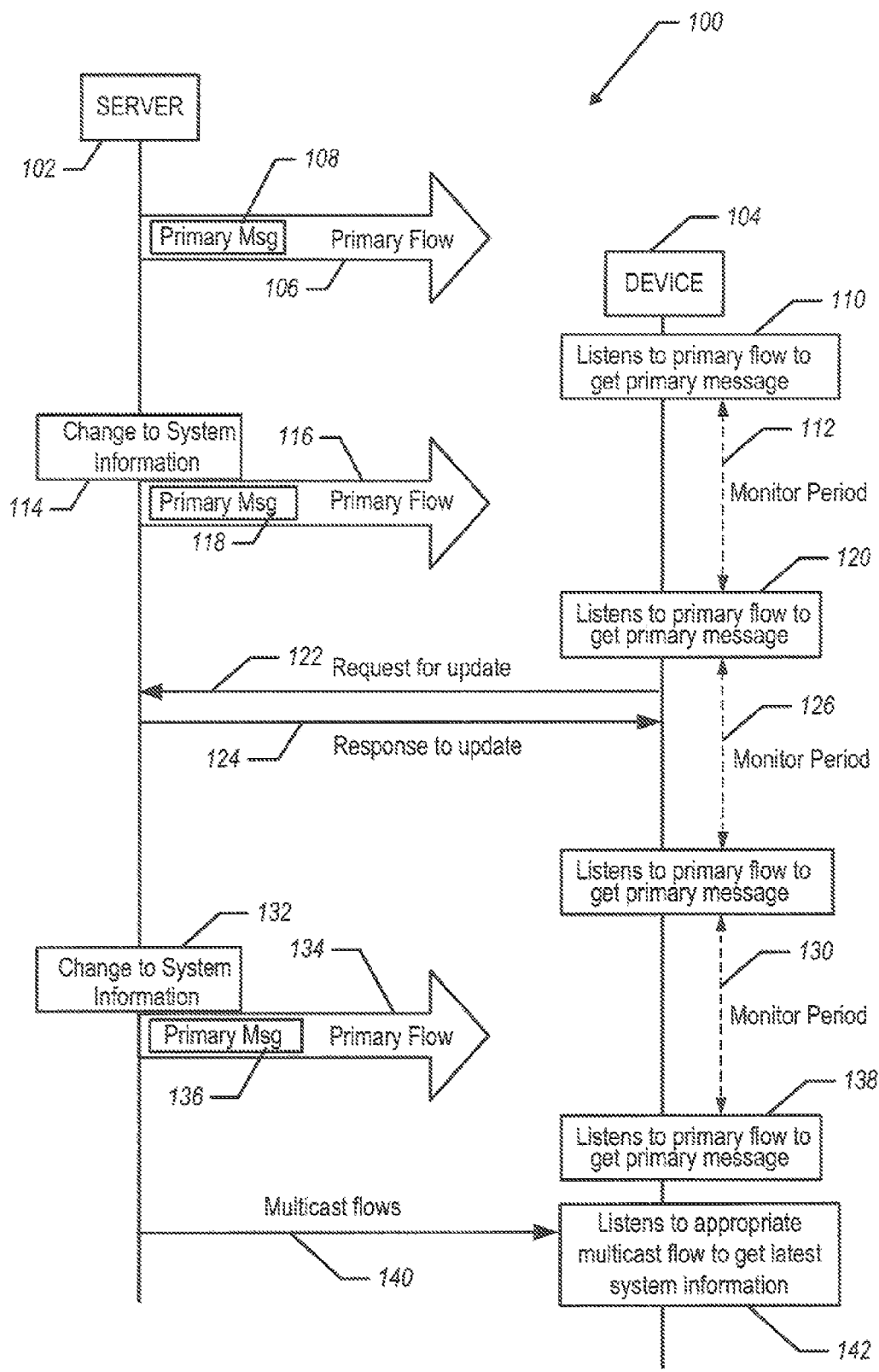
FIG. 1 is an illustration of an exemplary end-to-end call flow diagram utilizing a primary message in a content delivery system.

FIG. 1 shows an end-to-end call flow diagram 100 illustrating how the presently disclosed primary message may be utilized in a communication system. As shown in the diagram of FIG. 1, a content server 102 communicates with a device 104. A server 102 sends a primary flow 106 containing a primary message 108. The primary flow 106 may be a broadcast flow that is configured in a format well known to both the server 102 and the device 104 for purposes of optimization and speed of acquisition, but may also be of any other suitable flow format regardless of being commonly known to both server and device. Also, the primary message 108 may consist of abbreviated information or data indicating a current system state of a communication system in which the server 102 and device 104 operate.

When device 104 is turned on, the device 104 listens to the primary flow 106 in order to obtain the primary message 108 as indicated at block 110. If the data information within the primary message 108 communicates to device 104 that no change has occurred in the current system state, the device 104 simply disregards further information and enters a monitoring period, such as monitoring period 112. While the device is powered on, it periodically receives the primary message based on the frequency of the monitoring period. The duration of a monitoring period can be either a constant predefined period or a variable period as determined through an algorithm or as updated through external means.

Once a change occurs in the system information as shown by block 114, a primary flow 116 will contain a primary message 118 indicating the current, updated system information. Once device 104 listens to the primary flow message 116 as indicated in block 120 after monitoring period 112, it is contemplated that device 104 may execute a number of different reactions or responses. In one example, device 104 compares a state of the system information stored within the device and compares this with the information contained in primary message 118. If the information is the same, which is indicative of no change, device 104 takes no further action. However, in the case of primary message 118, which occurs after a change to system information 114, device 104 would then take further action to obtain updated system information. The process that device 104 executes to obtain updated information may be accomplished by at least two different procedures, which are illustrated in FIG. 1. Namely, the two procedures include device 104 either executing a unicast request and response transaction with server 102, or listening to multicast flows from server 102.

As an illustration of the first exemplary procedure, FIG. 1 shows device 104 effecting a unicast request/response transaction with server 102. In the particular illustrated timeline of FIG. 1, after device 104 listens to primary flow 116 and determines from primary message 118 that a change in system state information has occurred (as illustrated by block 114), device 104 may issue a request for update information as illustrated by unicast request 122 from device 104 to server 102. In response, server 102 issues a unicast response 124 with further second or additional data or information to be used by device 104 to acquire pertinent or relevant updated system state information for device 104.

As an example of the second contemplated procedure, device 104 may obtain update information after a change to system information by listening to multicast flows from server 102. In the context of the illustrated timeline of FIG. 1, the device listens to the primary flow during a monitor period 130, during which a change in the system state information occurs, as indicated by block 132. Server 102 issues a primary flow 134 containing a primary message 136 including current, updated system state information. Device 104 then determines from the updated primary message 136 that a system state change occurred. In this second exemplified procedure, the device 104 may be configured to acquire the updated system information by listening to multicast flows broadcast by server 104 containing second information or data which device 104 then listens to in order to obtain pertinent or relevant system information as indicated in block 142.

In the above examples, it is noted that device 104 may be configured to decide whether to acquire the updated system information (e.g., the second information) from either a unicast transaction or multicast flows based on a criterion of the type of system information that has been updated. It is noted that one skilled in the art will appreciate that other criterion for deciding how to acquire the updated system information after determining a system state change from the primary message may be contemplated.

It is further noted that the server 102 may be configured to repeatedly send a primary flow (e.g., 106) including a primary message (e.g., 108), regardless of whether a change to system information has occurred.

Figure 2:
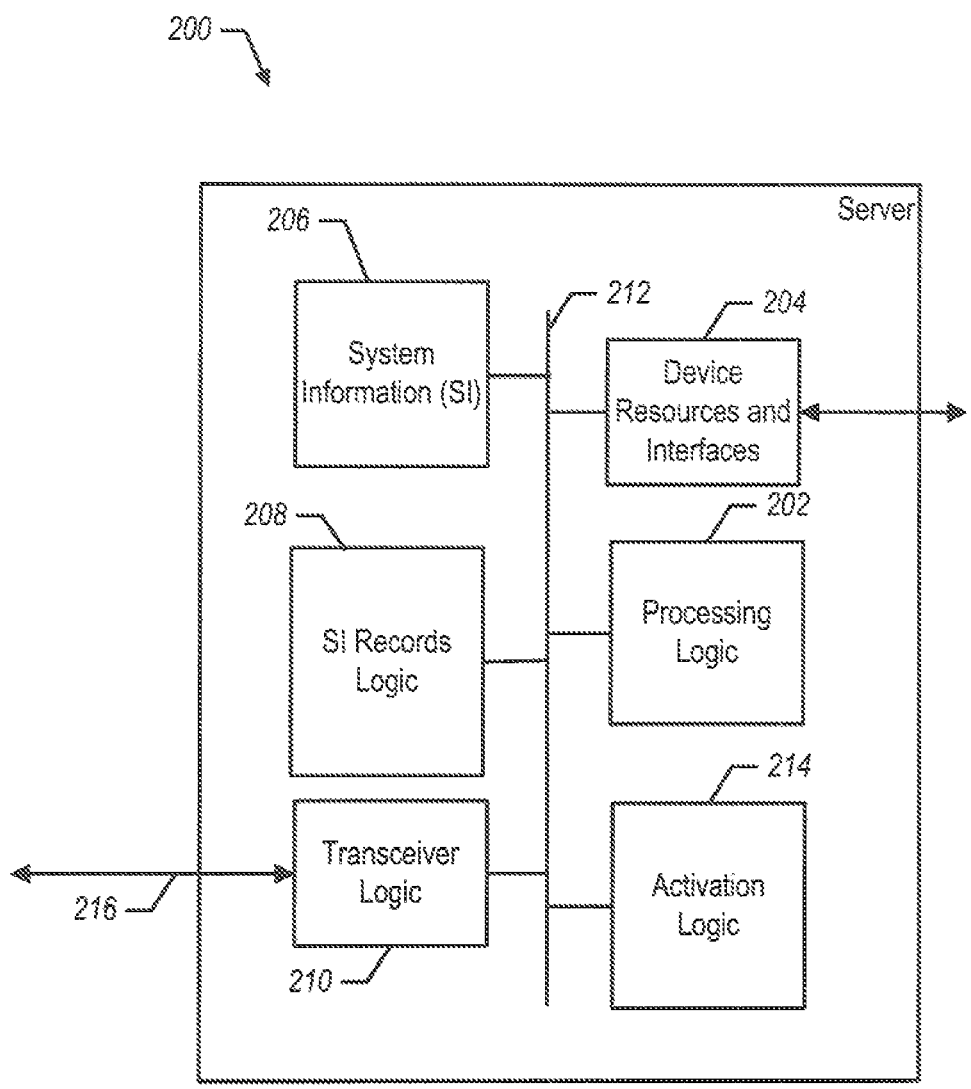
FIG. 2 shows an example of a server according to the present disclosure.

FIG. 2 shows an example of a content server 200. This server 200 may be one example of a server that may be used as server 102 in FIG. 1. As shown in FIG. 2, server 200 includes processing logic 202, resources and interfaces 204, and transceiver logic 210, all of which are coupled to an internal data bus 212. The server 200 also includes activation logic 214, system information (SI) 206, and SI records logic 208, which are also coupled to the data bus 212.

In one or more examples, the processing logic or module 202 may include a CPU, processor, gate array, hardware logic, memory elements, virtual machine, software, and/or any combination of hardware and software. Thus, the processing logic 202 generally includes logic to execute machine-readable instructions and to control one or more other functional elements of the server 200 via the internal data bus 212.

The resources and interfaces module 204 may be implemented by hardware, software, or a combination thereof that allows the server 200 to communicate with internal and external systems. For example, the internal systems may include mass storage systems, memory, display driver, modem, or other internal device resources. The external systems may include user interface devices, printers, disk drives, or other local devices or systems, as examples.

Transceiver logic or module 210 may include hardware logic and/or software that operates to allow the server 200 to transmit and receive data and/or other information with remote devices or systems using a communication channel 216. For example, in one example, communication channel 216 may consist of any suitable type of communication link to allow the server 200 to communicate with a data network. It is noted that in the context of the system of FIG. 1, communication channel 216 may be utilized to effect delivery of the primary flow between the server (e.g., server 102) and a device (e.g., device 104).

The activation logic or module 214 may include a CPU, processor, gate array, hardware logic, memory elements, virtual machine, software, and/or any combination of hardware and software. The activation logic 214 operates to activate a content server (CS) to allow the CS to select and receive content and/or services described in the system information module 206, for example.

Figure 3:
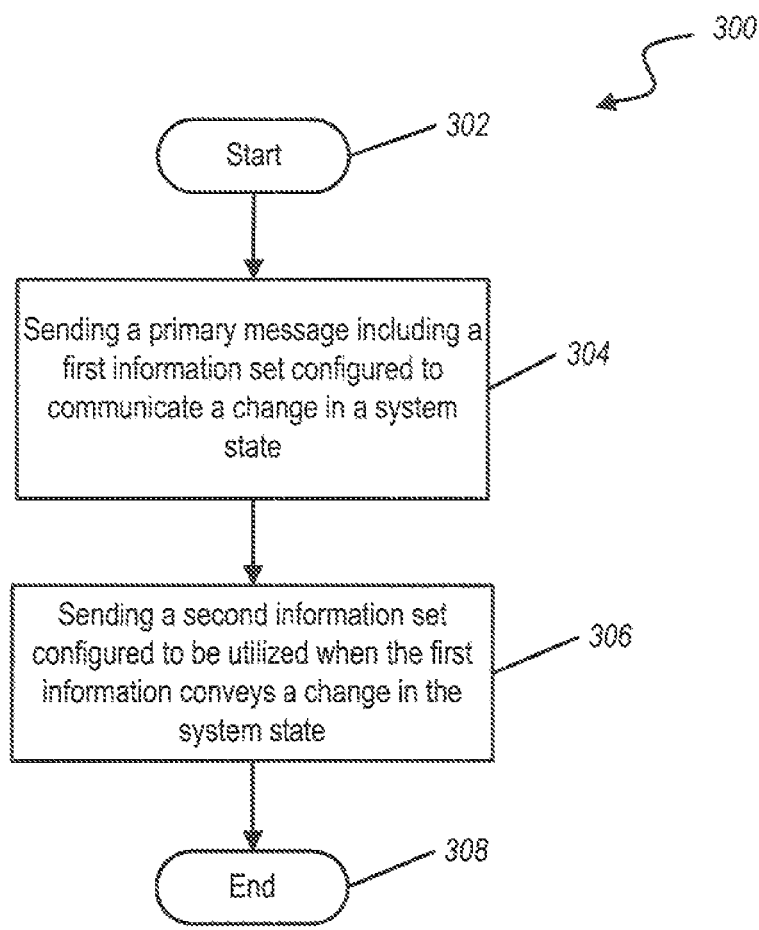
FIG. 3 illustrates a method that may be utilized by the content server of FIGS. 1 and 2.

FIG. 3 illustrates a method 300 that may be utilized by the content server of FIGS. 1 and 2. The method 300 begins at a start block 302 and proceeds to block 304. At block 304, a content server, for example, sends a primary message including first information set or data configured to communicate a change in a system state. In particular, the primary message may simply communicate a system state version, such as a number, which may then be utilized by a receiving device to compare to a previous system state version number in order to determine whether a change to the system has occurred.

After the primary message has been sent in block 304, flow proceeds to block 306 where a second information set is sent. This information set is configured to be utilized when the first information set or data conveys a change in the system state. As indicated previously in FIG. 1, the second information set or data may either be continuously sent in a multicast flow (e.g., 140 illustrated in FIG. 1) or may be sent as a response to a request for update as illustrated by transactions 122 and 124 in FIG. 1. After the process of block 306 is complete, flow proceeds to end block 308. It is noted that although start and end blocks are illustrated in the process 300, the server 102 or 200 continuously executes multicast transmission of the primary message as performed at block 304. In a multicast message situation, the operation of block 306 is also continuously performed to communicate further updated system information. In the unicast situation discussed in connection with transactions 122 and 124 in FIG. 1, the operation of block 306, as an example, would be executed by the content server (102 or 200) when requested to send the second or updated information set or data in order to communicate further relevant system information to one or more devices requesting updated information. It is noted that the process 300 of FIG. 3 may be executed by a content server such as server 102 illustrated in FIG. 1 or server 200 illustrated in FIG. 2.

Figure 4:
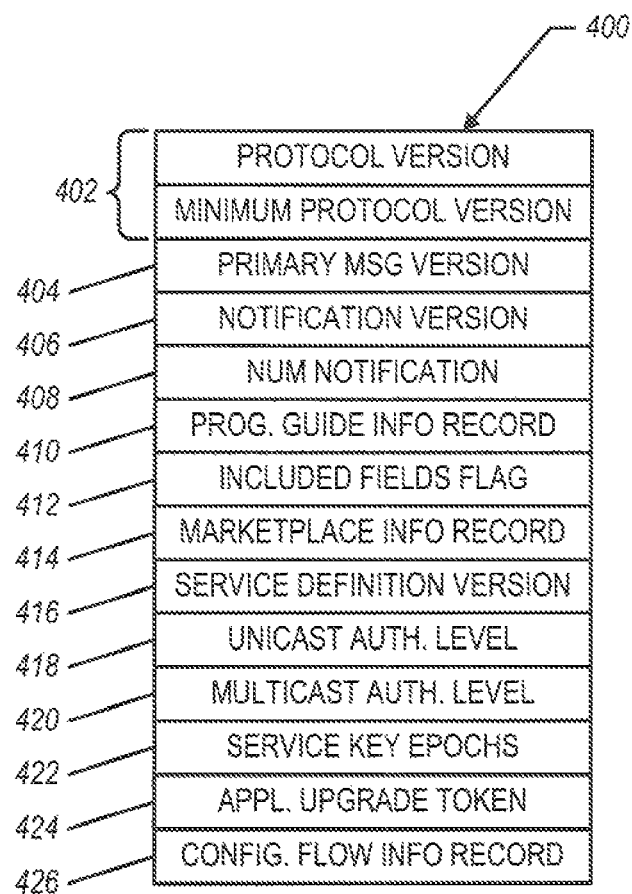
FIG. 4 illustrates an exemplary configuration of a primary flow message that may be sent by a server.

FIG. 4 illustrates an exemplary configuration of a primary flow message that may be sent by a network, such as server 102 or 200. In this example, the message 400 may include a first two information fields indicated by bracket 402, which feature a protocol version information and a minimum protocol version. The protocol version may be used to communicate the particular protocol version that a particular network supports. This protocol, in the particular disclosed example, may refer to an interface protocol between the network and the device and can be used to indicate the highest protocol version that the network supports. The minimum protocol version information may be further used to indicate a minimum protocol version that a network can support. An exemplary embodiment, the first two fields 402 are communicated to a device and contain information processed by the device before further information is obtained. That is, if a device protocol version falls outside of the range defined by the protocol version and the minimum protocol versions supported by the server, this can be used to communicate that the device protocol would not be compatible with versions supported by a content server. Accordingly, a device can respond appropriately to a particular network, such as a network that does not support the protocol version of the device. In such a case, for example, the device would not need to process further received information and, thereby waste processing resources.

A third field 404 is a primary message version, which is used to communicate changes in system information states. In particular, field 404 can simply consist of a version number of the primary message 400, which can convey to a device whether a change has occurred to the system state. For example, during a subsequent monitoring by a device, such as the monitoring periods illustrated in FIG. 1, the device can then use the primary message version field 404 to determine if the primary message version has changed from what was previously stored by the device. If no change in the version number is indicated, the device can simply return to a sleep mode in order to save power resources. On the other hand, if the primary message version indicated in field 404 has been incremented or changed, this change in version number communicates to a device, in a summarized or shorthand format, that changes have occurred in one or more of the subsequent fields within the primary message. Accordingly, the device (e.g, device 104) may then quickly determine whether it should proceed further to determine what particular system state information has changed. This summarized or shorthand format thus affords economization of system resources and processing, especially when system changes have not occurred since additional processing of other system information is avoided. It is noted that in alternative examples, the field 404 is only exemplary and may be not necessarily need to be included in primary message 400.

It is noted that the first three fields as indicated by bracket 402 and field 404 may be processed by a device in order to determine if the server or network supports the device and whether system state information has changed without incurring further processing or power resources when either the device is not supported or a system state has not changed. The additional fields 406 through 426 shown in FIG. 4 may then be processed when a system state change has occurred. This further additional data or information may be characterized as a type of directory that may be utilized by the device to trigger further processing to obtain actual system information updates for the particular features.

In particular, this further information contained in the primary message 400 first includes a notification version 406. If the version of the notification information field 406 has been changed from what was previously stored in a device, the device can then be triggered to acquire the notification flow to receive the updated notification information. Otherwise, the device can simply disregard or stop further processing of any notification information. In the example of FIG. 4, a number of notifications as shown in field 408 may also be included to communication the number of notification messages available. By providing an indication of the number of notifications, a device receiving the primary message obtains further information concerning how many notifications are being sent, such as for obtaining these messages from the content server.

Another field is a program guide information record 410, which contains specific information regarding programs of various services of a particular network. As an example, a particular network program guide can include title information for programs of various services offered by that specific network. The program guide would have particular versions associated with them to indicate the state. Accordingly, the primary message 400 may contain versions of current program guide information such that a device may compare the current version number of the program guide with a previously stored program version number to determine if a change has occurred and whether the device needs to acquire further program guide information based on the determined change.

Associated with the guide information field 410 is an included fields flag 412 that is used to indicate the presence of additional fields within the primary message 400, such as fields 414 through 426. Accordingly, if the flag is not set, the device receiving the primary message can easily determine whether further information is included in the primary message 400 or if the device can go back to sleep to save power resources. Thus, the flag in field 412 may serve, in an example, as a delineation between mandatory or essential fields in the primary message and further conditional fields used for additional, but less essential information concerning aspects of system state changes.

A first of these fields includes a market place information record field 414. This field refers to information about media packages that are available for subscription and associated costs, billing modes, etc. Similar to the other fields described above, field 414 may have a version number associated therein to indicate the particular state of the market place information. Thus, the market place information may then be used by a device to bear a version with a stored version number to determine if a change has taken place and to act accordingly.

Another field that may be included in the primary message 400 is a service definition 416. This refers to information about available services in a particular system. As an example, such information may include the type of service such as real time or non real time, the rating, the genre, geographical areas where services are available, etc. Again, this field may consist of a version to indicate the state or a change in state when a version is updated.

Further fields may include a unicast authentication level 418 and a multicast authentication level 420, which are used to signify which unicast messages and multicast messages are signed and verified, respectively. The primary message 400 may also include a field 422 for service key epochs. The service key epochs are used to define a time period during which a set of service keys are valid. During this time period media will be encrypted using the services keys that are valid for that epoch. The service key epoch indicates whether a device has the valid key for the current key epoch supported by the network. If not, a device is then signaled to fetch a latest key from the content server, otherwise the device can go back to sleep to conserve battery power.

Yet another field 422 may be included that communicates an application upgrade token. In particular, if a token has been updated as determined by comparing a stored value with the current token value in a device, this conveys to the device that a potential application upgrade is required for the device. Finally, the primary message 400 may include another field 426 that is used to support updates of configuration files within a device. In this case, a version number in field 426 can be used to indicate whether any of the configuration files for the device have been updated. If so, the device is then triggered to acquire an appropriate flow you get latest configuration files. It is noted that the primary message 400 illustrated in FIG. 4 is merely exemplary and that more or fewer fields may be utilized dependent on desired information to be communicated within the primary message.

Figure 5:
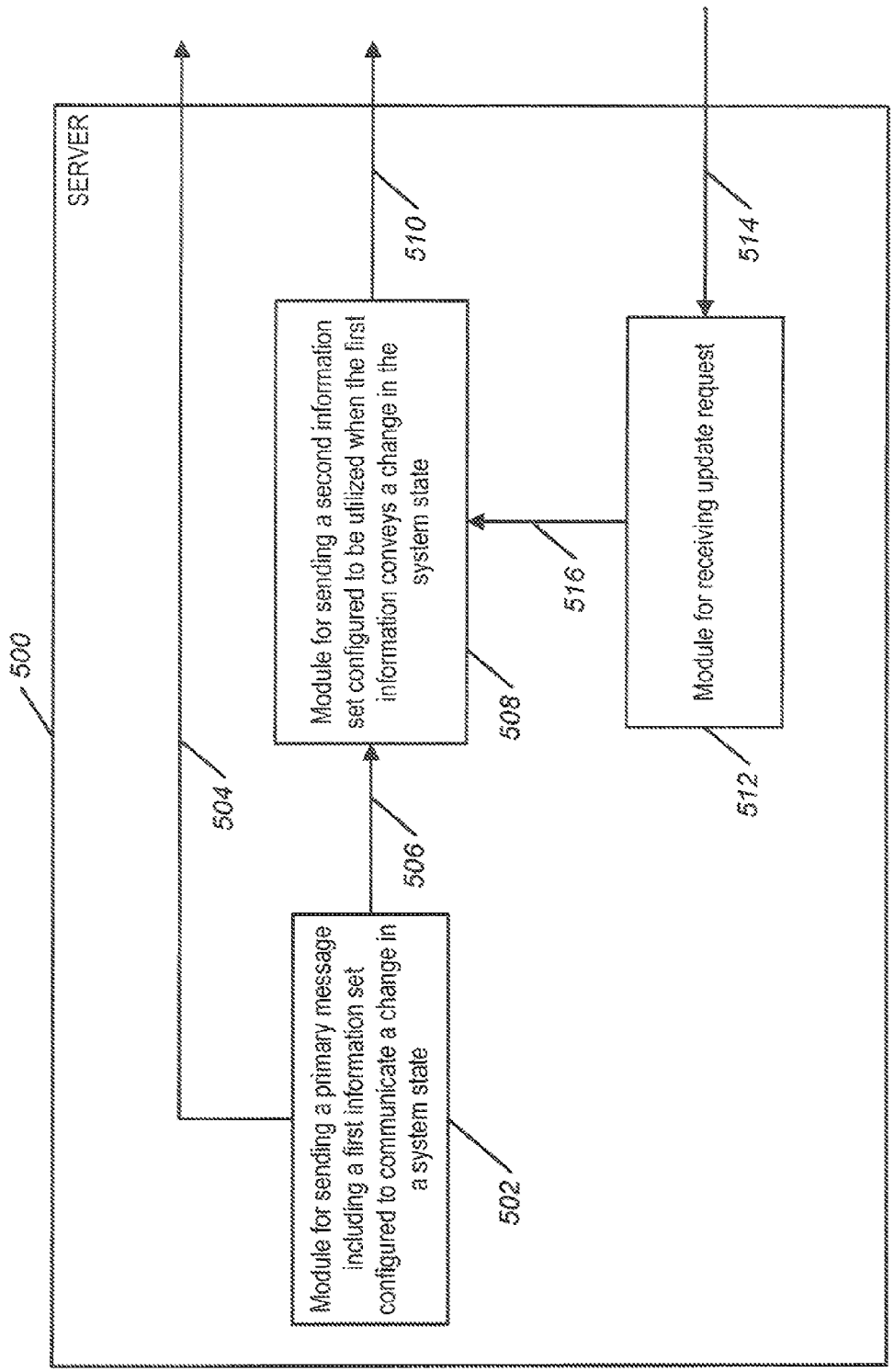
FIG. 5 illustrates another exemplary apparatus that may be utilized to serve content in a communication network.

FIG. 5 illustrates another apparatus that may be utilized to serve content in a communication network. In particular, the apparatus may consist of a content server 500 that includes a module for sending a primary message including a first information set configured to communicate a change in a system state 502. It is noted that module 502 may be implemented by one or more of the modules illustrated in FIG. 2 such as transceiver logic 210 and processing 202. The module 502 sends the primary message over a communication coupling 504 to communicate the primary message to one or more receiving devices within a network. Additionally, module 502 is communication with a module for sending a second information set configured to be utilized when the first information set conveys a change in the system state 508. Module 502 is communicatively coupled to module 508 via a communication coupling 506.

It is further noted that the first information set may consist of any number of information fields such as those illustrated in FIG. 4 and that the second information set can consist of further actual update information that is to be acquired by devices when one or more changes in systems state are communicated. It is also noted that module 508 also outputs the second information via a communication link 510 to one or more receiving devices. It is yet further noted that modules 502 and 508 may continuously and repeatedly communicate the first and second information sets, respectively. Additionally, module 508 may also be configured to communicate with a module 512 for receiving update requests via a communication link 514 from one or more user devices in a network. Thus, when update requests are received in response to the primary message, module 512 communicates such requests via a communication link 516 to module 508 to subsequently transmit the second information set via communication link 510 to the user devices.

Figure 6:
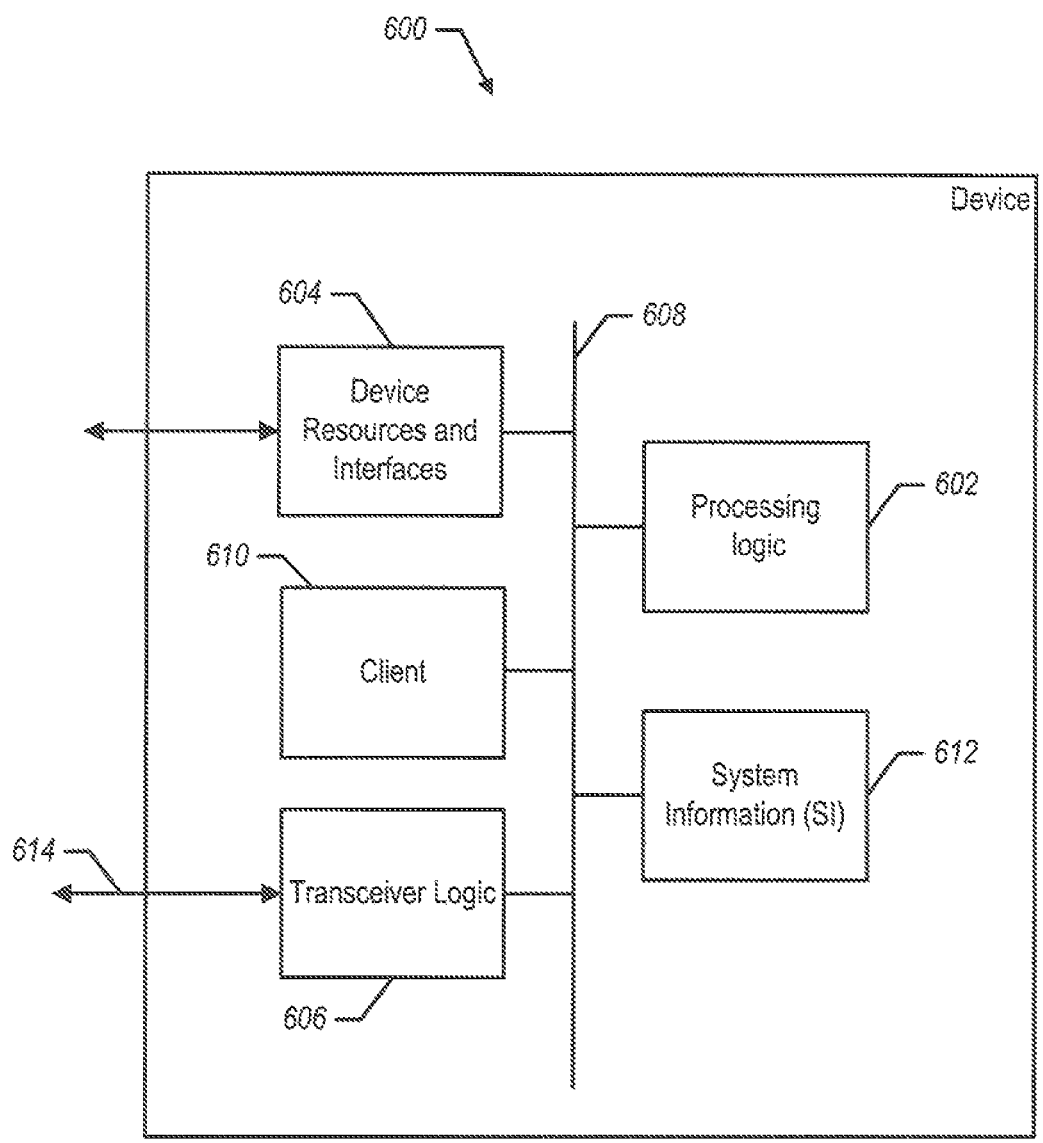
FIG. 6 shows an example of a device for use in a content delivery system.

FIG. 6 shows an example of a device 600 suitable for use in a content delivery system. For example, device 600 may be the device 104 shown in FIG. 1. Device 600 includes processing logic 602, resources and interfaces 604, and transceiver logic 606, all coupled to a data bus 608. The device 600 also comprises a client 610, a program logic 614 and a SI logic 612, which are also coupled to the data bus 608.

In one or more examples, the processing logic 602 may be implemented by a CPU, processor, gate array, hardware logic, memory elements, virtual machine, software, and/or any combination of hardware and software. Thus, the processing logic 602 generally comprises logic configured to execute machine-readable instructions and to control one or more other functional elements of the device 600 via the internal data bus 608.

The resources and interfaces 604 comprise hardware and/or software that allow the device 600 to communicate with internal and external systems. For example, internal systems may include mass storage systems, memory, display driver, modem, or other internal device resources. The external systems may include user interface devices, printers, disk drives, or other local devices or systems.

The transceiver logic 606 comprises hardware and/or software that operate to allow device 600 to transmit and receive data and/or other information with external devices or systems, such as content server 102 or 200 shown in FIGS. 1 and 2, through communication channel 614. Communication channel 614 may comprise a network communication link, a wireless communication link, or any other type of communication link, as examples.

During operation, device 600 is activated so that it may receive available content or services over a data network. For example, the device 600 may identify itself to a content server during an activation process. As part of the activation process, device 600 receives and stores SI records by SI logic 612. The SI logic 612 contains information that identifies content or services available for the device 600 to receive. The client 610 operates to render information in the SI logic 612 on the device 600 using the resources and interfaces 604. For example, the client 610 may render information in the SI logic 612 on a display screen (not shown) that is part of device 600. The client 610 also receives user input through the resources and interfaces so that a device user may select content or services.

Figure 7:
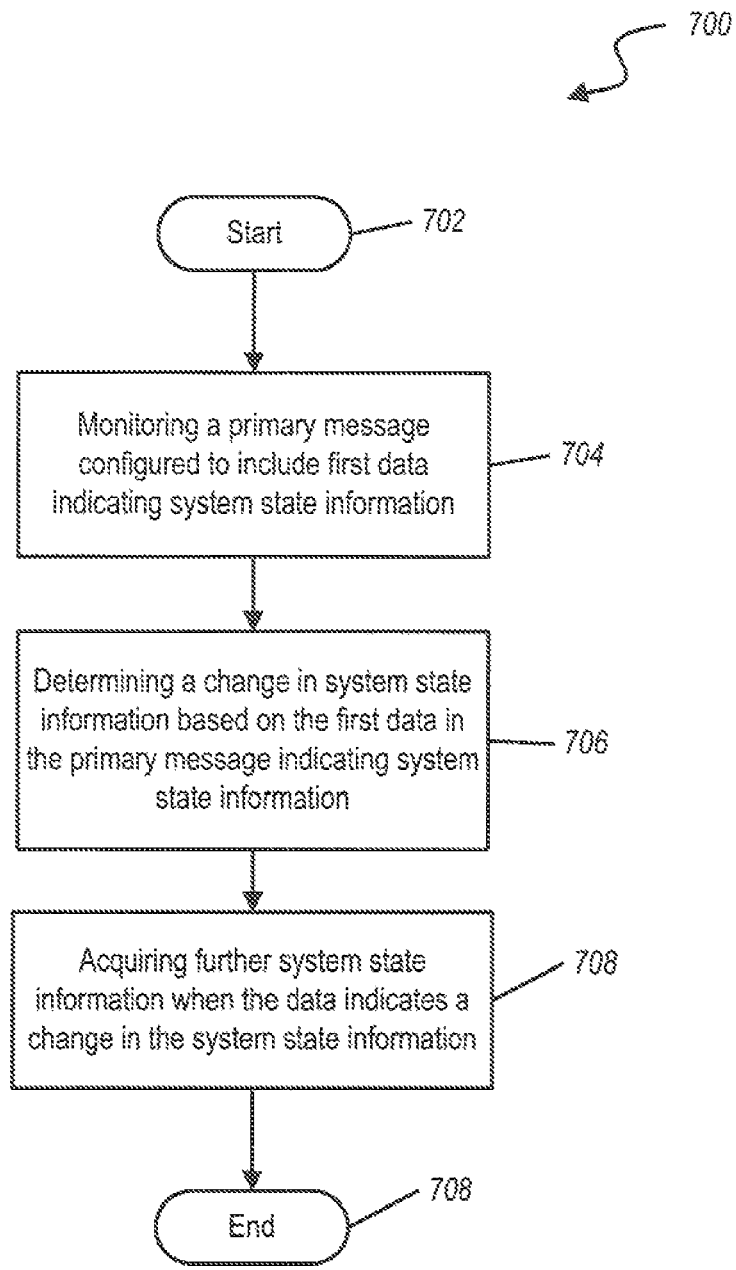
FIG. 7 illustrates a method for obtaining system state information within a device in communication with a server.

FIG. 7 illustrates a method for obtaining system state information in a device such as device 104 in FIG. 1 or 600 in FIG. 6. The method 700 begins at a start block 702 and proceeds of block 704. At block 704 the method 700 includes monitoring a primary message configured to include first data indicating system state information. As an example of the first data, this may include any of the fields illustrated in FIG. 4. After the primary message is monitored in block 704, flow proceeds to block 706 where a change in the system state information is determined based on the first data in the primary message. Flow then proceeds to block 706 where further system state information is acquired when the first data indicates a change in the system state information. Flow then proceeds to in block 708. It is noted that the process 700 is continuously repeated to monitor primary messages delivered from a content server, such as server 102, for example. Additionally, in block 706 if a system state change is not determined, the device would not obtain further system state information as illustrated in block 708, but would simply ignore further information and return to either a sleep or monitoring mode.

Figure 8:
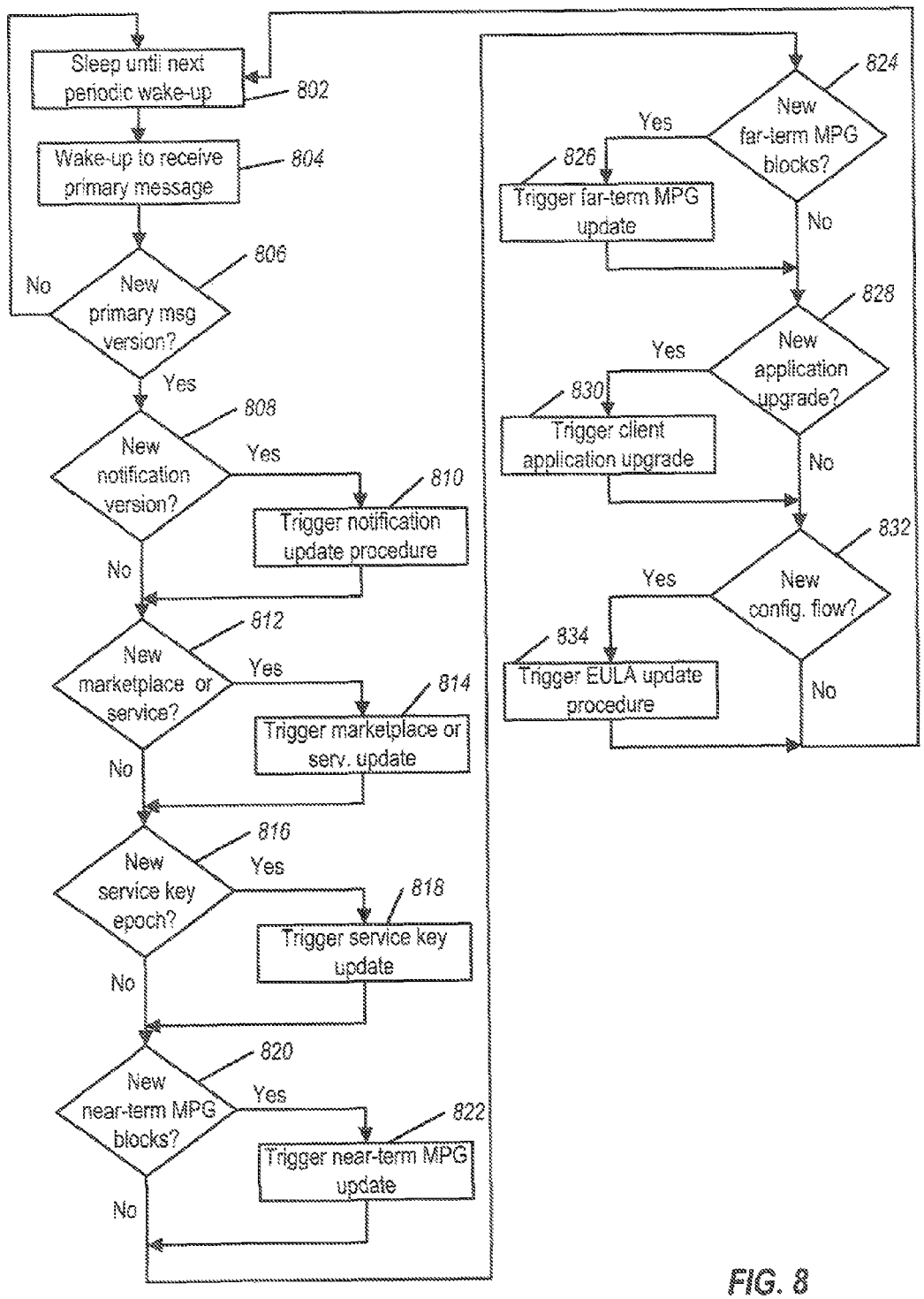
FIG. 8 illustrates another method for obtaining system state information within a device in communication with a server

FIG. 8 illustrates another method or process 800 that may be effected within a device in communication with a content server in order to obtain system state changes. As illustrated in the process 800 a device is in a sleep mode until a next periodic wake up period 802, wherein a device monitors for receipt of a primary message. Flow proceeds to block 804 where the device wakes up to receive the primary message. Next, flow proceeds to decision block 806 where the device determines whether a new primary message version has been received. As an example of the type of information received, FIG. 4 illustrates that the primary message version in field 404 that consists of a version number. This version number may then be used for effecting the decision in decision block 806 to determine whether the primary message version is changed by comparing to a previously stored value within the device.

After block 806 flow proceeds to decision block 808 where the device further determines whether a new notification version is communicated by the information within the primary message. If, at block 806, a new primary message version is not detected, flow proceeds back to block 802 where the device goes back to sleep until a next periodic wake up period. Alternatively, if a new primary message version is determined at block 806, flow proceeds to block 808 to determine if a new notification version has been indicated. An example of the information sent to determine notification versions is illustrated in field 406 of FIG. 4. This data may consist of a version number for the notification version. If a new notification version is determined by the device at block 808, flow proceeds to block 810 where a notification update procedure is triggered and further or second data specific to the actual notification information is reformed. Alternatively, if no new notification version has been sent as determined in block 808, flow proceeds to block 812. After block 810, flow also proceeds to decision block 812.

At block 812 the device next may determine whether new marketplace or service definition information is indicated. An example of this information was illustrated previously in FIG. 4 in fields 414 and 416. If new market place or service information is indicated at block 812, flow proceeds to block 814 where a update procedure for obtaining market place or service data is triggered. After the process of block 814 is triggered, flow proceeds to decision block 816. Alternatively, at block 812, if no new market place or service information is determined, flow proceeds to decision block 816 directly.

At decision block 816, a new service key epoch or epochs is determined as discussed previously, this information may also be contained in the primary message such as field 422 shown in FIG. 4. If a new service key epoch has been sent, flow proceeds to block 818 where a service key update is triggered and flow proceeds to decision block 820. If no new service key epochs have been sent in the primary message as determined in block 816, flow proceeds directly to block 820.

At decision block 820, the device determines whether new near term program guide information is indicated in the primary message. If so, flow proceeds to block 822 where near term program guide update procedures are triggered. If not, flow simply proceeds from block 820 to block 824. At 824, the device further determines if new far term program guide blocks are indicated in the primary message. If so, flow proceeds to block 826 where far term program guide update procedures are triggered and flow then proceeds to block 828. Alternatively, if no new far term guide blocks have been indicated, flow proceeds from block 824 directly to block 828.

At decision block 828, a device may determine whether new application upgrades, such as application upgrade tokens are indicated within the primary message. If new application upgrades are available, flow proceeds to block 830 where a client application upgrade procedures are triggered, and then flow proceeds to decision block 832. If no new application upgrades have been provided as determined at block 828, flow proceeds directly to block 832. An example of a field within the primary message indicating application upgrade tokens was shown previously in field 424 of FIG. 4.

Finally, at decision block 832, a device may determine whether new configuration flow information has been sent. If new configuration flow information has occurred as determined at block 832, flow proceeds to block 834 where an end user license agreement (EULA) update procedure is triggered to allow a user to obtain the latest versions of device configuration files such as proprietary files. Flow then proceeds back to block 802 where the device enters a sleep mode until a next periodic wakeup period. Additionally as shown, if no new configuration flow information is indicated as determined at block 832, flow proceeds directly from block 832 back to block 802.

It will be appreciated that the procedure 800 illustrated in FIG. 8 demonstrates that the primary message version such as the information in field 404 of FIG. 4, may be changed any time one or more of the other fields 406 through 426 have changed. Thus, device may go back to sleep if any of the fields 406 through 426 have not been changed, thereby resulting in no change in the primary message version. Thus, the primary message version field 404 affords a quick or short hand method for indicating system change and, thus further processing as indicated by the processing of steps 808 through 834 of FIG. 8. Additionally, it is to be understood that the subsequent fields within the primary message occurring after the primary message version field can be used to trigger further operations for performing update procedures used to acquire further data from a content server. Thus, the information in the primary message can be characterized as acting as a directory of various system state changes requiring the acquisition of further second data from a content server.

Figure 9:
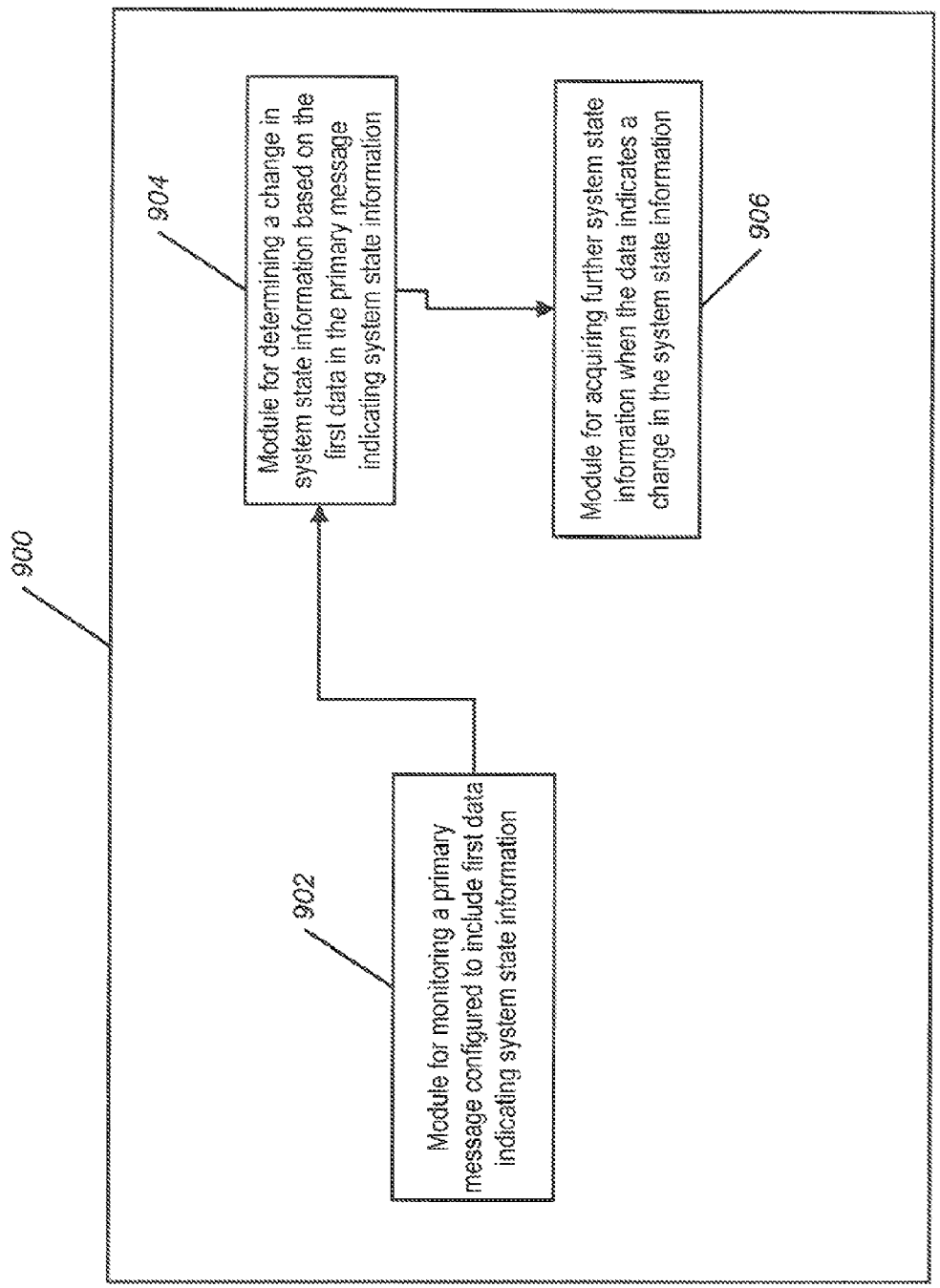
FIG. 9 illustrates yet another example of an apparatus for receiving a primary message in a device from a server.

FIG. 9 illustrates yet another example of an apparatus for receiving a primary message in a device from a content server. The apparatus 900, as illustrated in FIG. 9, includes a module for monitoring a primary message configured to include first data indicating system state information 902. Example, this module 902 may be effected by more of the modules illustrated in device 600 of FIG. 6, such as transceiver logic 606 and processing logic 602, as examples. The apparatus 900 further includes module for determining a change in system state information based on the first data in the primary message indicating system state information. Module 904 may be implemented by one or more of the modules of device 600, such as processing logic 602, for example. Module 904 communicates with a module 906 for acquiring further state information when the first data indicates a change in the system state information. This module 906 may be implemented by any number of the modules illustrated in FIG. 6, such as transceiver logic 606, processing logic 602, and device resources and interfaces module 604, as examples.

It is noted that the apparatus 900 may be implemented within a device, such as device 600 and may consist of hardware, software, firmware or any combination thereof.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for conveying system information to a wireless device, comprising:
    sending a primary message comprising first information, wherein the first information comprises a summary of system state version information and directory information, the directory information comprising location information that indicates where the wireless device may locate system state update information in a wireless network and information that specifies unicast messages that are signed and verified, and the system state version information being indicative of updates to the directory information; and
    sending a second information set comprised of the system state update information in accordance with the location information, wherein sending the second information set comprises sending the second information set via one or more of the unicast messages in response to receiving an update request from the wireless device.

2. The method as defined in claim 1, wherein the primary message is configured as a summary message configured to convey communication of a current system state to the wireless device in an abbreviated manner.

3. The method as defined in claim 2, wherein the system state version information comprises a primary message system state version information field that is changed with each change in the system state.

4. The method as defined in claim 1, wherein the directory information is configured to communicate location information to the wireless device where the wireless device may locate the second information set in a wireless network.

5. The method as defined in claim 1, wherein the primary message is repeatedly sent to the wireless device.

6. The method as defined in claim 1, wherein the second information set is repeatedly sent to the wireless device.

7. The method as defined in claim 1, wherein the wireless device receives the primary information over at least one of a wireless broadcast network or channel.

8. The method as defined in claim 1, wherein the first information comprises a program guide information record field comprising information regarding programs of various services of a particular network.

9. The method as defined in claim 1, wherein the first information comprises a market place information record field comprising information regarding media packages that are available for subscription.

10. The method as defined in claim 1, wherein the first information comprises a plurality of system state version information fields related to application upgrades and configuration file updates for the wireless device.

11. An apparatus for conveying system information to a wireless device, comprising:
    means for sending a primary message comprising first information, wherein the first information comprises a summary of system state version information and directory information, the directory information comprising location information that indicates where the wireless device may locate system state update information in a wireless network and information that specifies unicast messages that are signed and verified, and the system state version information being indicative of updates to the directory information; and
    means for sending a second information set comprised of the system state update information in accordance with the location information, wherein sending the second information set comprises sending the second information set via one or more of the unicast messages in response to receiving an update request from the wireless device.

12. The apparatus as defined in claim 11, wherein the primary message is configured as a summary message configured to convey a current system state to the wireless device in an abbreviated manner.

13. The apparatus as defined in claim 12, wherein the system state version information comprises a primary message system state version information field that is changed with each change in the system state.

14. The apparatus as defined in claim 11, wherein the directory information is configured to communicate location information to the wireless device where the wireless device may locate the second information set in a wireless network.

15. The apparatus as defined in claim 11, wherein the means for sending the primary message is configured to repeatedly sent the primary message to the wireless device.

16. The apparatus as defined in claim 11, wherein the means for sending the second information set is configured to repeatedly send the second information set.

17. The apparatus as defined in claim 11, wherein the first information comprises a program guide information record field comprising information regarding programs of various services of a particular network.

18. The apparatus as defined in claim 11, wherein the first information comprises a market place information record field comprising information regarding media packages that are available for subscription.

19. The apparatus as defined in claim 11, wherein the first information comprises a plurality of system state version information fields related to application upgrades and configuration file updates for the wireless device.

20. The apparatus as defined in claim 11, wherein the primary information is sent to the wireless device over at least one of a wireless broadcast network or channel.

21. A computer program product, comprising:
    a non-transitory computer-readable medium comprising:
        code for causing a computer to send a primary message comprising first information, wherein the first information comprises a summary of system state version information and directory information, the directory information comprising location information that indicates where a wireless device may locate system state update information in a wireless network and information that specifies unicast messages that are signed and verified, and the system state version information being indicative of a change in the directory information, wherein the change in the directory information corresponds to an upgrade of an application comprising an update to a first content item of a plurality of content items of the application; and
        code for causing the computer to send the upgrade of the application comprising the update to the first content item of the plurality of content items of the application in accordance with the location information, wherein sending the upgrade of the application comprises sending the upgrade of the application via one or more of the unicast messages in response to receiving an update request from the wireless device.

22. The computer program product as defined in claim 21, wherein the primary message is configured as a summary message configured to convey a current system state to the wireless device in an abbreviated manner.

23. The computer program product as defined in claim 22, wherein the system state version information comprises a primary message system state version information field that is changed with each change in the system state.

24. The computer program product as defined in claim 21, wherein the upgrade to the application further comprises an update to a second content item of the plurality of content items of the application.

25. The computer program product as defined in claim 21, wherein the primary message is repeatedly sent to the wireless device.

26. The computer program product as defined in claim 24, wherein the update to the second content item of the plurality of content items of the application is repeatedly sent.

27. The computer program product as defined in claim 21, wherein the primary message comprises a plurality of system state version information fields related to application upgrades and configuration file updates for the wireless device.

28. The computer program product as defined in claim 21, wherein the primary message comprises a program guide information record field comprising information regarding programs of various services of a particular network.

29. The computer program product as defined in claim 21, wherein the primary message comprises a market place information record field comprising information regarding media packages that are available for subscription.

30. The computer program product as defined in claim 21, wherein the primary information is sent to the wireless device over at least one of a wireless broadcast network or channel.

31. A server processor for conveying system state information to a wireless device, comprising:
a first hardware module for sending a primary message comprising first information, wherein the first information comprises a summary of system state version information and directory information, the directory information comprising location information that indicates where the wireless device may locate system state update information in a wireless network and information that specifies unicast messages that are signed and verified, and the system state version information being indicative of updates to the directory information; and
a second module for sending a second information set comprised of the system state update information in accordance with the location information, wherein sending the second information set comprises sending the second information set via one or more of the unicast messages in response to receiving an update request from the wireless device;
wherein the first information further comprises a plurality of system state version information fields corresponding to a plurality of types of system state information, wherein each of the plurality of system state version information fields is configured to indicate a change in a corresponding one of the plurality of types of system state information, and
wherein one of the plurality of system state version information fields corresponds to an application upgrade or a configuration file update for the wireless device.

32. The server processor as defined in claim 31, wherein the primary message is configured as a summary message configured to convey a current system state to the wireless device in an abbreviated manner.

33. The server processor as defined in claim 31, wherein the first information comprises a primary message system state version information field that is changeable with each change in the system state.

34. The server processor as defined in claim 31, wherein the first hardware module is configured to repeatedly send the primary message to the wireless device.

35. The server processor as defined in claim 31, wherein the second module is configured to repeatedly send the second information set to the wireless device.

36. The server processor as defined in claim 31, wherein the plurality of system state version information fields comprise a program guide information record field comprising information regarding programs of various services of a particular network.

37. The server processor as defined in claim 31, wherein the plurality of system state version information fields comprise a market place information record field comprising information regarding media packages that are available for subscription.

38. The server processor as defined in claim 31, wherein the one of the plurality of system state version information fields corresponds to the application upgrade, and the application upgrade corresponds to an update of content of an application.

39. The server processor as defined in claim 31, wherein the primary information is sent to the wireless device over at least one of a wireless broadcast network or channel.

40. A method for obtaining system information in a wireless device, comprising:
receiving a primary message comprising a summary of system state version information and directory information, the directory information comprising location information that indicates where the wireless device may locate system state update information in a wireless network and information that specifies unicast messages that are signed and verified, and the system state version information being indicative of updates to the directory information;
determining an update of the directory information based on the system state version information in the primary message; and
acquiring, when the update of the directory information is determined, content corresponding to the update of the directory information from a location indicated by the directory information via one or more of the unicast messages, wherein acquiring the content comprises sending a request for the content and acquiring the content via the one or more of the unicast messages in response to the request.

41. The method as defined in claim 40, wherein the system state version information corresponds to an interface protocol between the wireless device and a network.

42. The method as defined in claim 40, wherein the acquiring the content comprises receiving the content when the update of the directory information is determined.

43. The method as defined in claim 40, wherein the system state version information comprises a current version number.

44. The method as defined in claim 43, wherein determining the update of the directory information based on the system state version information in the primary message comprises comparing a previously stored version number with the current version number to determine the update of the directory information.

45. The method as defined in claim 40, further comprising: sending the request for the content based on the directory information.

46. The method as defined in claim 40, wherein the primary message is configured as a summary message configured to reduce an amount of processing by the wireless device in order to determine the update of the directory information.

47. The method as defined in claim 40, wherein the primary message comprises a program guide information record field comprising information regarding programs of various services of a particular network.

48. The method as defined in claim 40, wherein the primary message comprises a market place information record field comprising information regarding media packages that are available for subscription.

49. The method as defined in claim 40, wherein the primary message comprises a plurality of system state version information fields related to application upgrades and configuration file updates for the wireless device.

50. The method as defined in claim 40, further comprising determining whether a value associated with the system state version information is greater than a previously stored value.

51. An apparatus for obtaining system information, comprising:
means for receiving a primary message comprising a summary of system state version information and directory information, the directory information comprising location information that indicates where a wireless device may locate system state update information in a wireless network and information that specifies unicast messages that are signed and verified, and the system state version information being indicative of updates to the directory information;
means for determining an update of the directory information based on the system state version information in the primary message; and
means for acquiring, when the update of the directory information is determined, content corresponding to the update of the directory information from a location indicated by the directory information via one or more of the unicast messages, wherein acquiring the content comprises sending a request for the content and acquiring the content via the one or more of the unicast messages in response to the request.

52. The apparatus as defined in claim 51, wherein the system state version information corresponds to an interface protocol between the wireless device and a network.

53. The apparatus as defined in claim 51, wherein the means for acquiring the content comprises means for receiving the content when the update of the directory information is determined.

54. The apparatus as defined in claim 51, wherein the system state version information comprises a current version number.

55. The apparatus as defined in claim 54, wherein determining the update of the directory information based on the system state version information in the primary message comprises comparing a previously stored version number with the current version number to determine the update of the directory information.

56. The apparatus as defined in claim 51, further comprising:
means for sending the request for the content based on the directory information.

57. The apparatus as defined in claim 51, wherein the primary message is configured as a summary message configured to reduce an amount of processing by the wireless device in order to determine the update of the directory information.

58. The apparatus as defined in claim 51, wherein the primary message comprises a program guide information record field comprising information regarding programs of various services of a particular network.

59. The apparatus as defined in claim 51, wherein the primary message comprises a market place information record field comprising information regarding media packages that are available for subscription.

60. The apparatus as defined in claim 51, wherein the primary message comprises a plurality of system state version information fields related to application upgrades and configuration file updates for the wireless device.

61. The apparatus as defined in claim 51, wherein the means for determining determines whether a value associated with the system state version information is greater than a previously stored value.

62. A computer program product, comprising:
a non-transitory computer-readable medium comprising:
code for causing a computer to receive a primary message comprising a summary of system state version information and directory information, the directory information comprising location information that indicates where a wireless device may locate system state update information in a wireless network and information that specifies unicast messages that are signed and verified, and the system state version information being indicative of updates to the directory information;
code for causing the computer to exclusively process the system state version information of the primary message and to determine the update to an application based on the system state version information; and
code for causing the computer to acquire, when the update to the application is determined, changed first content item of a plurality of content items of the application from a location identified by the directory information via one or more of the unicast messages, wherein acquiring the content comprises sending a request for the content and acquiring the content via the one or more of the unicast messages in response to the request.

63. The computer program product as defined in claim 62, wherein the update to the application further comprises a change in a second content item of the plurality of content items of the application.

64. The computer program product as defined in claim 63, further comprising code for causing the computer to send a request for the second content item when the update to the application is determined and receiving the second content item in response to the request.

65. The computer program product as defined in claim 63, further comprising code for causing the computer to receive the second content item when the update to the application is determined.

66. The computer program product as defined in claim 62, wherein the system state version information comprises a current version number.

67. The computer program product as defined in claim 66, wherein the code for causing the computer to determine the update to the application based on the system state version information in the primary message comprises code for causing the computer to compare a previously stored version number with the current version number to determine the update to the application.

68. The computer program product as defined in claim 63, wherein the non-transitory computer-readable medium further comprises code for causing the computer to send a request for the changed first content item of the plurality of content items based on the directory information.

69. The computer program product as defined in claim 62, further comprising code for causing the computer to enter a low power state when the update to the application is not determined.

70. The computer program product as defined in claim 62, wherein the primary message comprises a program guide information record field comprising information regarding programs of various services of a particular network.

71. The computer program product as defined in claim 62, wherein the primary message comprises a market place information record field comprising information regarding media packages that are available for subscription.

72. The computer program product as defined in claim 62, wherein the primary message comprises a plurality of system state version information fields related to application upgrades and configuration file updates for the wireless device.

73. The computer program product as defined in claim 62, further comprising code for causing the computer to determine whether a value associated with the system state version information is greater than a previously stored value.

74. A wireless device for receiving system state information, comprising:
a first module for receiving a primary message configured to comprise first data, the first data comprising a summary of system state version information and directory information, the directory information comprising location information that indicates where the wireless device may locate system state update information in a wireless network and information that specifies unicast messages that are signed and verified, and the system state version information being indicative of updates to the directory information; and
a second module for determining a change in the system state information based on the first data in the primary message indicating the system state information;
wherein the first data comprises a plurality of system state version information fields corresponding to a plurality of types of system state information, wherein each of the plurality of system state version information fields is configured to indicate a change in a corresponding one of the plurality of types of system state information,
wherein one of the plurality of system state version information fields corresponds to an application upgrade or a configuration file update for the wireless device; and
a third module for acquiring second data via one or more of the unicast messages when a change in the first data is determined, wherein acquiring the second data comprises sending a request for the second data and acquiring the content via the one or more of the unicast messages in response to the request.

75. The wireless device as defined in claim 74, wherein the module for acquiring the second data is configured to receive second data comprising system state update information when a change in system information is determined.

76. The wireless device as defined in claim 74, wherein the first data comprises a current system state version number.

77. The wireless device as defined in claim 74, wherein the second module for determining the change in system state information based on the first data in the primary message is configured to compare a previously stored system state version number with the current system state version number to determine the change in system state information.

78. The wireless device as defined in claim 74, further comprising:
the first data comprising directory information configured to communicate location information to the wireless device; and
a fourth module for sending the request for the second data based on the directory information.

79. The wireless device as defined in claim 74, wherein the primary message is configured as a summary message configured to reduce an amount of processing by the wireless device in order to determine the system state information.

80. The wireless device as defined in claim 74, wherein the plurality of system state version information fields comprise a program guide information record field comprising information regarding programs of various services of a particular network.

81. The wireless device as defined in claim 74, wherein the plurality of system state version information fields comprise a market place information record field comprising information regarding media packages that are available for subscription.

82. The wireless device as defined in claim 74, wherein the one of the plurality of system state version information fields corresponds to the application upgrade, and the application upgrade corresponds to an update of content of an application.

83. The wireless device as defined in claim 74, wherein the second module is further configured for determining whether a value associated with one of the plurality of system state version information fields is greater than a previously stored value.

* * * * *